United States Patent [19]
Galas

[11] Patent Number: 5,759,318
[45] Date of Patent: *Jun. 2, 1998

[54] APPARATUS AND METHOD FOR RELEASABLY FUSING MOLD LENS PIECES

[75] Inventor: Stephen Galas, Jacksonville, Fla.

[73] Assignee: Johnson & Johnson Vision Products, Inc., Jacksonville, Fla.

[*] Notice: The term of this patent shall not extend beyond the expiration date of Pat. No. 5,528,357.

[21] Appl. No.: 761,409

[22] Filed: Dec. 6, 1996

Related U.S. Application Data

[62] Division of Ser. No. 622,079, Mar. 26, 1996, Pat. No. 5,648,024.
[51] Int. Cl.$^6$ ............................................. B29D 11/00
[52] U.S. Cl. .................... 156/73.1; 156/580.2; 264/1.1; 264/1.27; 264/2.7; 264/445; 425/174.2; 425/808
[58] Field of Search ................. 156/73.1, 73.5, 156/228, 307.1, 580.1, 580.2, 583.1; 425/174.2, 808; 264/1.1, 1.27, 2.7, 442, 443, 445

[56] References Cited

U.S. PATENT DOCUMENTS

| | | | |
|---|---|---|---|
| 3,899,378 | 8/1975 | Wragg et al. | 156/73.5 |
| 4,529,473 | 7/1985 | Mims | 159/580.2 |
| 5,135,592 | 8/1992 | Melvin | 156/73.1 |
| 5,152,788 | 10/1992 | Isaacson et al. | 623/6 |
| 5,518,578 | 5/1996 | Persells et al. | 156/580.1 |
| 5,593,620 | 1/1997 | Galas | 264/1.1 |
| 5,648,024 | 7/1997 | Galas | 264/1.1 |

Primary Examiner—James Sells

[57] ABSTRACT

A method and apparatus for releasably securing mold pieces used to mold an artificial eye lens, for example a hydrophilic contact lens. The apparatus includes an ultrasonic welding system to provide directed energy, modified so that the output horn is convex to extend within the outer concave portion of one of the mold pieces and has a shoulder to rest upon the flange of said piece thereby centering it. The method applies directed energy, such as ultrasonic vibrations, through the energy emitter horn to soften or melt then fuse the mating peripheral edge portion of the lens mold pieces.

6 Claims, 4 Drawing Sheets

APPARATUS AND METHOD FOR RELEASABLY FUSING MOLD LENS PIECES

This is a division of application Ser. No. 08/622,079, filed Mar. 26, 1996, U.S. Pat. No. 5,648,024, which is hereby incorporated by reference.

BACKGROUND OF THE INVENTION

It is known in the field of artificial eye lenses, consisting of intraocular lenses and contact lenses, that one method of manufacturing such lenses is by molding where the lens being manufactured is totally enclosed by a mold in contrast to lathe cutting or spin casting. Typically, the mold consists of two pieces mated together after a monomer mixture is placed in the concave portion of one of the mold pieces.

This process of molding is known in the art and is described for contact lenses, for example, in U.S. Pat. Nos. 4,565,348 and 4,640,489. One of the obstacles to be overcome in such a process is the appropriate placement and fixation of the mold pieces after the monomer has been placed into the concave portion of one mold and prior to polymerization.

Another requirement of any method used to fix the mold pieces together is that after polymerization of the monomer into a lens, the pieces must be easily separated in order that the contact lens can be removed.

A variety of traditional methods are satisfactory and appropriate in a non-production laboratory situation for placing one mold piecing upon another and then securing the two pieces in a relatively fixed position such as by weighting or clamping.

When considered with the requirement that the mold pieces be easily separable after polymerization of the monomer into a contact lens and that the fixing and separating process needs to be part of an automated high speed manufacturing process, it can be appreciated that methods and apparatus appropriate for accomplishing the above requirements on a small scale may not translate into acceptable methods and apparatus in production. Not only is speed of great importance, but the mold pieces must be fixed in such a way that tolerances and uniformity are tightly controlled in production to ensure lens uniformity and quality.

Directed energy techniques, such as ultrasonic welding are known in the art for permanently joining materials such as polymers without consideration for later separation. The usual goal is to attain the strongest bond possible.

It is therefore an object of the present invention to provide an apparatus and method for releasable fixing the separate pieces of an artificial eye lens mold which is capable of separation after polymerization of the monomer into an artificial eye lens.

It is a further object of the present invention to provide such a method and apparatus for fixing the mold pieces which require little or no modification to the current shape or material of the molds being used.

It is another object of the invention to provide a method and apparatus where parameters used to fix and the bond strength of the resulting secured mold pieces are easily quantifiable and variable.

It is yet another object of the present invention to provide an apparatus and method for securing artificial eye lens mold pieces that do not have a deleterious effect on the lens being made, but rather contribute to a uniform, close tolerance lens.

SUMMARY OF THE INVENTION

These and other objects are attained by the method and apparatus of the present invention wherein a directed energy device provides localized energy to one or both of the mold pieces causing a softening of the contact portion of the mold piece material and upon cooling, fusion. For example with ultrasonic welding, one piece is caused to vibrate relative to the other fixed, mating piece. This vibration causes softening of the mold material in a localized contact area to a controlled extent. When the application of the directed energy, such as ultrasonic energy, is terminated after a predetermined period of time, the softened portions of the mold pieces quickly cool and fuse so that a weld is made around the peripheral circumference of the optical portion of the lens mold. With careful control of the directed energy amplitude, duration, total energy and part preload, a weld is formed that joins the mold pieces firmly, yet allows for easy post-polymerization separation. Other methods of practicing the invention may employ apparatus for directing energy such as focused infrared radiation and radio frequency emitters, or other frictional forms of heating such as linear vibration and spin welding.

Each of these techniques is practiced in a manner contrary to the prevailing art (which attempts to form the strongest bond possible) by limiting the energy and controlling the amount of fusion.

In another aspect of the invention, the emitter which supplies the ultrasonic energy is configured so that it may also apply a centering force upon a mold piece initially free to move, so that the pieces are aligned properly.

DETAILED DESCRIPTION OF THE PREFERRED EMBODIMENT

Figure 1:
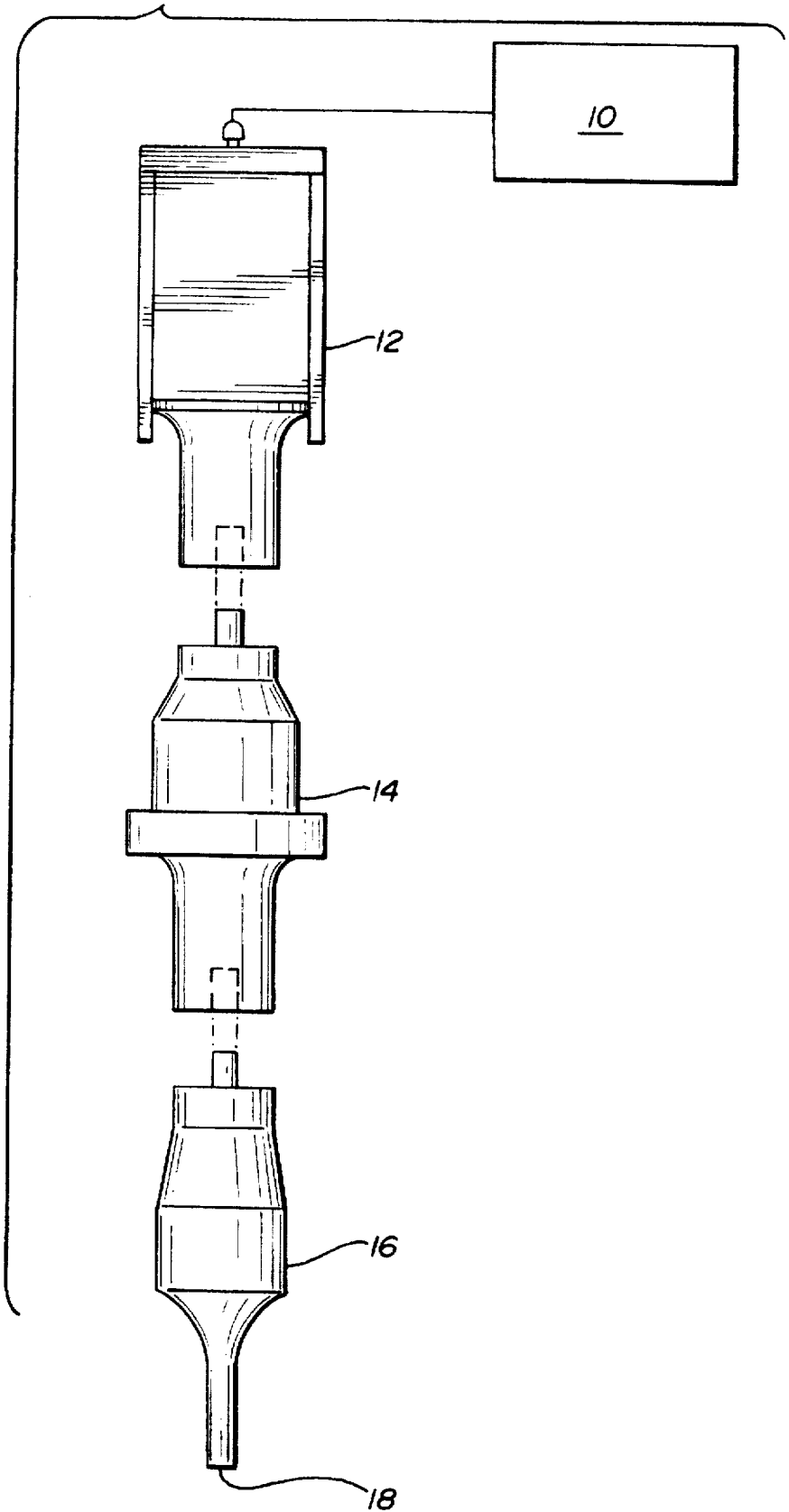
FIG. 1 is a schematic exploded diagram showing a portion of the apparatus of one embodiment of the present invention utilizing ultrasonic energy.

A description of the construction of the mold pieces used to mold contact lenses is given in the above referenced patents. The mold pieces are not reusable, and deformation and fusion of the non-optical portion pieces is acceptable as part of the lens production process.

Of the two basic polymer types, thermoplastic and thermoset, a thermoplastic material is one which after being formed and with the introduction of heat and pressure, can be softened and reformed undergoing only a change of state. This characteristic makes thermoplastics suitable for directed energy welding. In contrast, a thermoset is a material that once formed undergoes an irreversible chemical change and cannot be reformed with the reintroduction of heat and pressure and, therefore, is not typically a suitable candidate for directed energy welding.

A number of factors effect the energy requirements and weldability of various plastics. Amorphous materials are characterized by a random molecular arrangement and a broad softening or glass transition temperature range, soften gradually, and typically deform and flow without premature solidification. In contrast, semicrystalline materials are characterized by regions of orderly molecular arrangement and sharp melting and resolidification temperature points. In welding of semicrystalline resins, the sharp melting point is the result of a high energy requirement (high heat of fusion) necessary to breakdown the semicrystalline structure to allow material flow. Once the molded material leaves the heated area, these plastics harden rapidly with only a small reduction in temperature. Welding may be performed, but with greater attention to controlling weld parameters.

A number of directed energy techniques and apparatus can take advantage of the property of materials that can soften, deform and fuse in a localized area.

One example is linear vibration welding which can be used with suitable mold materials to join mold pieces. Linear vibration welding is accomplished by an apparatus wherein the mold pieces are held together with the appropriate force, one piece held stationary while the other is vibrated in a direction perpendicular to the contact force direction. The friction generated melts or softens the material at the point of contact and the parts fuse together. Typical frequencies of the linear vibration welding emitter are from 200 Hz to 300 Hz. Materials preferred for making mold pieces suitable for linear vibration welding include polyamide, polystyrene or a composition containing polystyrene.

Another method for joining mold pieces of a suitable material is hot plate welding which uses an apparatus containing a heated platen of controlled temperature and heat transfer where one of the pieces to be molded is placed on or near the heated platen emitter. The surfaces of the mold piece or pieces are softened or melted and then quickly forced together in a press after removal from the platen. Materials preferred for hot plate welding and suitable for use as contact lens mold pieces include polyethylene, polypropylene and polyvinyl chloride.

Another method particularly suited to welding of contact lens mold pieces is spin welding in which an apparatus is used to rapidly rotate in a circular motion one mold piece while the other mold piece is held stationary and pressed against the rotating piece. The friction generated between the two pieces melts or softens the material at the point of contact and the parts fuse together when the rotation is ceased. Spin welding is typically performed about the rotationally symmetric axis, as is found on lens mold pieces. Preferred materials for spin welding contact lens mold pieces are polyamide, polystyrene or a composition containing polystyrene.

Another method and apparatus within the scope of the invention is radio frequency welding wherein mold pieces of suitable material are placed in the field of an emitter producing electromagnetic energy in a frequency, ranging from 1 mHz to 200 mHz. The electromagnetic energy increases the molecular vibration of certain molecules in the material to the point of creating sufficient heat to soften or melt the mold piece. The mold pieces are clamped together under pressure and the energy delivered is controlled to a specific depth or tailored to a specific material used as part of the lens mold piece to cause the mold pieces to fuse together. A preferred material suitable for making the lens mold pieces for radio frequency welding is polyvinyl chloride.

Another method suitable for welding lens mold pieces is an apparatus that emits and focuses infrared energy in a specific plane melting or softening a particular plane of material but not softening the entire mold piece. Focused infrared welding causes softening or melting of the lens mold material by the radiant energy. While the radiant energy sources is in place or shortly after it is removed, the mold pieces are clamped in a press until fused. Preferred lens mold materials suitable for focused infrared welding include polyethylene, polypropylene, polyvinyl chloride, polystyrene or a composition containing polystyrene.

The preferred embodiment of the present invention is a method employing an ultrasonic welding apparatus to releasably join artificial eye lens mold pieces to secure the pieces during polymerization. Ultrasonic welding involves the use of high frequency mechanical vibrations transmitted through plastic parts to generate a frictional heat buildup at an interface. In contrast to linear vibration welding, ultrasonic welding provides vibrational energy parallel to the direction the pieces are pressed together and at a much higher frequency.

While amorphous materials are typically very efficient with regard to their ability to transmit ultrasonic vibrations and can be welded under a wide range of force and amplitude combinations, semicrystalline materials are more resilient and internally absorb a higher percentage of high frequency, mechanical vibrations. With these types of materials, it is more difficult to transmit the ultrasonic energy to the joint interface and high amplitudes of vibration are usually required.

Even within the subset of plastics consisting of thermoplastics having an amorphous structure, other factors can effect the weldability of a material by directed energy. One is the melting or softening temperature, the higher the melt or softening temperature of a material the more energy is required. Another is the stiffness of the plastic to be welded which influences its ability to transmit energy to the joint interface. Typically, a stiffer material has better transmission capabilities. The mold pieces described in the above referenced patents are made of polystyrene which is a preferred candidate for ultrasonic welding, but other materials are suitable and may be chosen for making the lens mold material. Amorphous polymers such as polystyrene, polycarbonate, acrylonitrile/butadiene/styrene compositions, acrylics and polysulfone can be readily joined with ultrasonic energy. Semicrystalline resins such as acetal, polypropylene, polyethylene, nylon, polyethylene terephthalate, polyether ether ketone, and liquid crystal polymers may also be joined with ultrasonic energy.

Handbook-type data relating to ultrasonic welding, both far field and near field (that is greater than ¼ inch and less than ¼ inch from the horn contact surface), as well as swaging, staking, insertion, and spot welding is readily available to the practitioners in this art. It is noted that such empirical data reveals that polystyrene is rated excellent in the ease and effectiveness of welding using ultrasonic techniques.

The following description is the preferred embodiment directed by way of example to molding of contact lenses, but the requirements for the other type of artificial eye lens, an intraocular lens, is essentially the same and the present invention similarly applicable.

Referring now to FIG. 1, shown is the ultrasonic welding system used in the present invention. The modification to the output part of the horn and the preferred parameters associated with operating the system are given in the following.

The ultrasonic welding system is comprised of a power supply 10 which converts 60 Hz line current to a frequency range from 20 kHz to 40 kHz by the use of solid state power devices. This high frequency electrical energy is supplied to a converter 12. This component changes the electrical energy into ultrasonic mechanical vibratory energy at the frequency of the converted electrical energy supply which is typically 20 kHz to 40 kHz.

The vibratory ultrasonic acoustical energy is then transmitted through an amplitude modifying device called a booster 14. The booster is a passive (i.e., non-powered) device which is used to modify the output amplitude of the converter before it reaches the horn 16.

The horn 16 is an acoustical tool that transfers the vibratory energy directly to the plastic polystyrene mold pieces that are being assembled.

The vibrations are transmitted through the polystyrene to the contact or joint area where vibratory energy is converted to heat through friction that softens and deforms the plastic. When this softened state is reached at the part interface vibration is stopped. Pressure is maintained briefly on the parts while the plastic solidifies to create a molecular bond between the parts. The entire cycle is usually under one second and the strength of the joint is approximately that of the parent material, particularly because with a thermoplastic material the melting and solidifying of plastic does not effect the properties.

Figure 2:
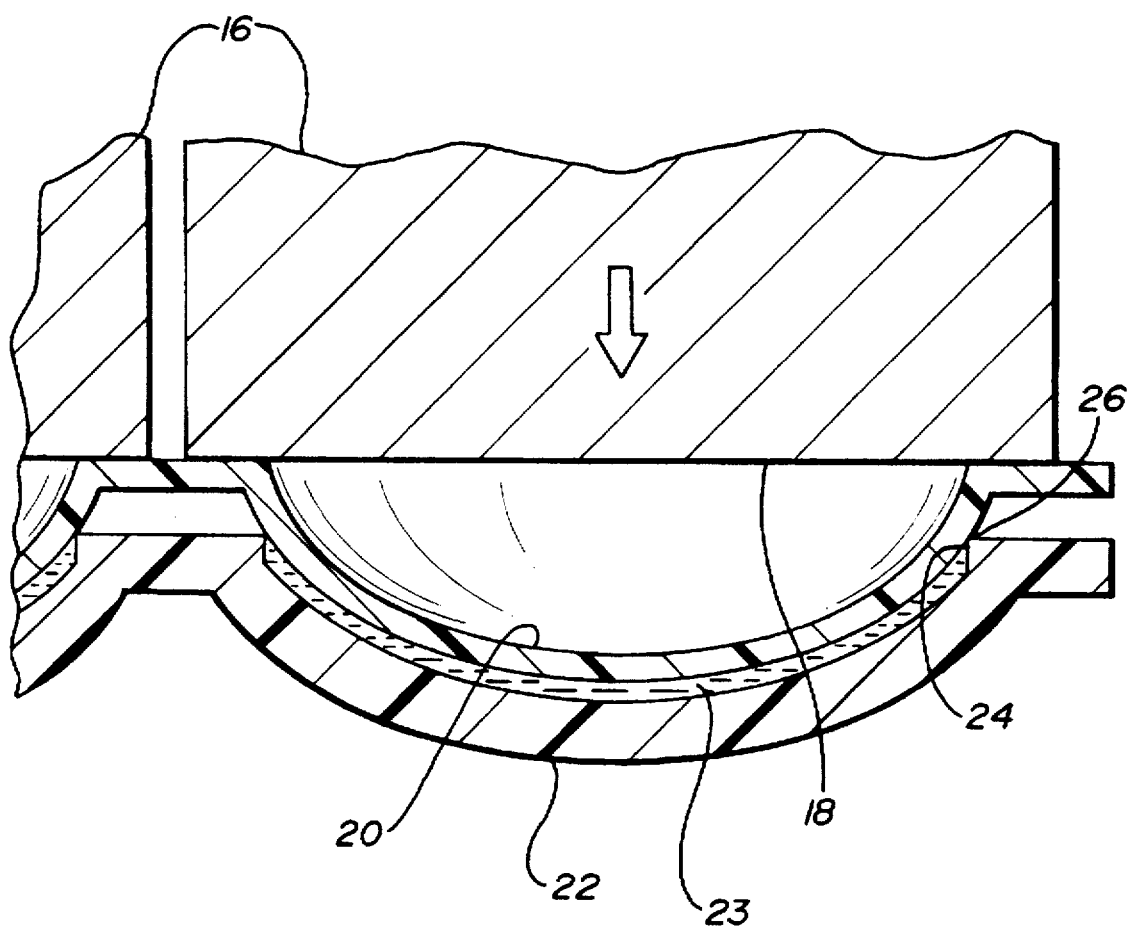
FIG. 2 is a cross sectional view showing a portion of the apparatus of the preferred embodiment in appropriate relation to the mold pieces.

Referring now to FIG. 2 an embodiment of the invention is shown wherein a conventional ultrasonic horn 18 is sized to be approximately the outer diameter of one of the mold pieces 20. The mold piece 20 proximate the ultrasonic horn vibrates with the acoustical energy emitted from the ultrasonic horn 18 while the other mold piece 22 is fixed so that a relative motion at the frequency of the acoustic energy takes place between the two mold pieces.

In this embodiment the ultrasonic horn 18 is placed proximate the mold piece having the outer concave portion 20 containing the back optical surface, and the mold having the inner concave portion 22 containing the front optical surface is fixed.

As can readily be appreciated by one in the field of contact lenses, it is important that the mold pieces be properly centered relative to each other. In the embodiment shown in FIG. 2, this is accomplished by ultrasonic horn 18 applying force on mold piece 20 prior to initiation of the ultrasonic welding.

As known by those skilled in the art, ultrasonic welding between plastic pieces is best accomplished when a small surface area interface exists between the two pieces in order to concentrate the vibratory energy and resulting friction on a small area, hastening the softening process. A small protrusion from one or both pieces to be joined, commonly called an energy director, provides such a surface.

In FIG. 2 is shown a small annular protrusion 24 around the periphery of the optical portion of the mold piece containing the inner concave portion. This protrusion, or energy director, is in contact with the inner-convex surface of piece 20 over a very small area around the periphery of the optical portion of the mold pieces. When the acoustical energy is applied to mold piece 20 the resulting friction along the energy director interface 26 quickly softens the polystyrene of both pieces 22 and 20 which then fuse together upon cooling.

Figure 3:
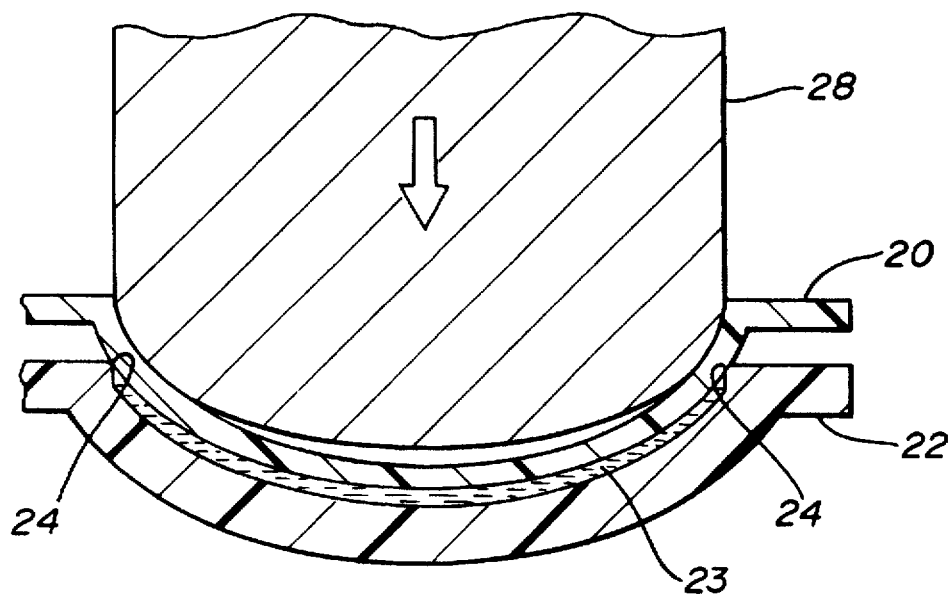
FIG. 3 is a cross sectional plan view of a portion of a more preferred embodiment of the apparatus of the present invention in relation to the mold.

FIG. 3 shows a more preferred embodiment wherein an ultrasonic horn 28 is of a size and convex shape that allows it to extend within the outer concave portion of mold piece 20.

The embodiment shown in this FIG. 3 has the advantage of applying the ultrasonic energy at a point closer to the energy director 24 than in the previous embodiment shown in FIG. 2.

Figure 4:
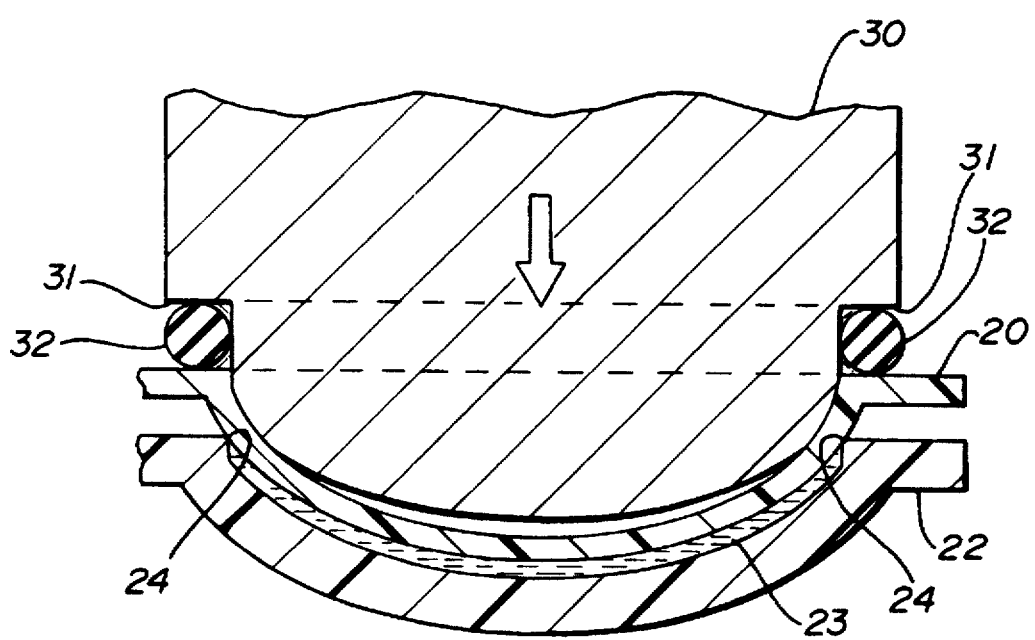
FIG. 4 shows in cross sectional plan view the most preferred embodiment of the apparatus of the present invention in relation to the contact lens mold.

Referring now to FIG. 4 shown is the most preferred embodiment which has advantages associated with the embodiments shown both in FIG. 2 and FIG. 3.

In this embodiment ultrasonic horn 30 not only is sized to extend within the outer concave portion of mold piece 20, but is shaped to have shoulders 31 a small distance beyond the flange of mold piece 20 to accept a rubber o-ring 32.

This rubber o-ring functions to transmit a centering force to mold piece 20 to center said mold piece on the mating mold piece 22, but not transmitting significant acoustical vibrational energy during the welding cycle.

This is important because it has been found that application of acoustical energy near the flange of a mold piece causes cavitation of the monomer 23 between the mold pieces which yields an opaque or cloudy lens.

Figure 5:
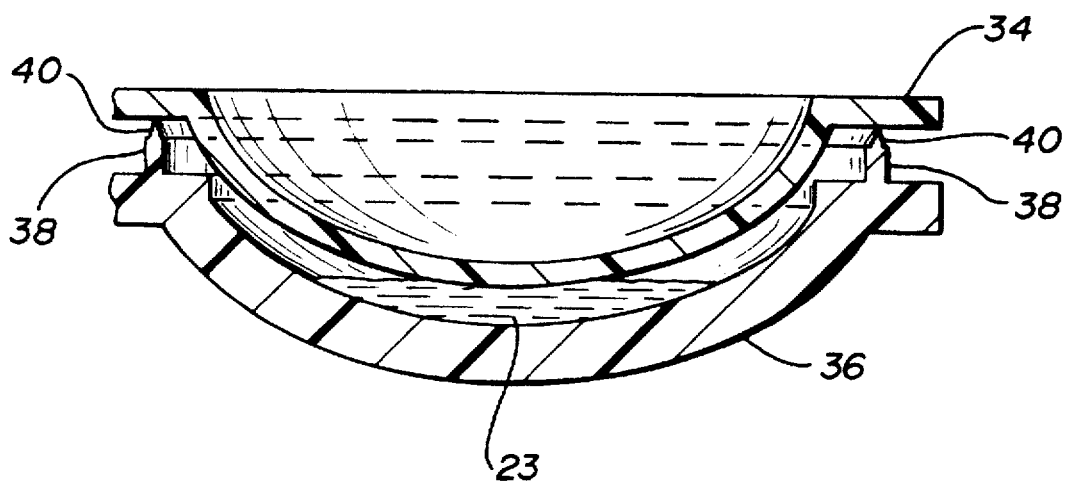
FIG. 5 shows in cross-section an alternate embodiment of the contact lens mold pieces which may be used with the method and apparatus of the present invention.
Figure 6:
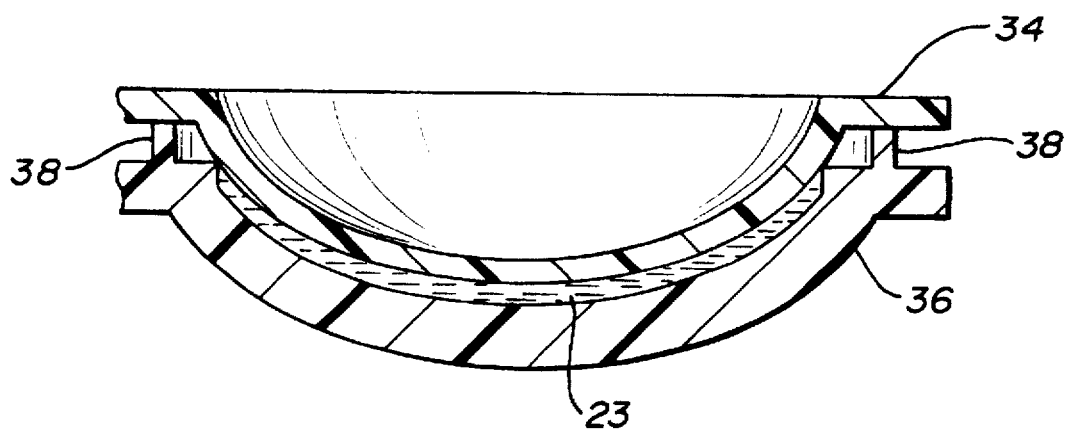
FIG. 6 shows the mold pieces of FIG. 5 after ultrasonic welding according to the present invention.

Turning now to FIG. 5 an alternate embodiment of the present invention is shown wherein the polystyrene mold pieces have been modified to specifically accommodate ultrasonic welding. In this embodiment the outer concave mold piece 34 is of a conventional size and shape. The inner concave mold piece 36, however, contains an additional strut 38 and an energy director 40 which is attached to strut 38 to provide a separate welding area apart from the protrusion 42 which forms the edge of the lens.

In some instances it may not be desirable to cause any deformation of protrusion 42 which forms the edge of the contact lens. In this embodiment, as ultrasonic energy is applied to either of the mold pieces, but preferably the outer concave mold piece 34, the energy director is caused to melt and fuse with a portion of the mold piece containing the outer concave portion 34. In this embodiment, the protrusion 42 makes intimate contact with the mold piece 34 forming the lens peripheral edge without deformation or fusion of protrusion 42.

The present invention is practiced with the above described apparatus as follows: an ultrasonic welding apparatus as described above, such as that from the Branson Ultrasonics Corporation of Danbury, Conn. has a 700 watt ultrasonic converter 12 operating at 40 kHz. A booster is employed, such as the silver booster 14 by Branson, having a 1 to 2 input amplitude to output amplitude ratio. The horn 16 is machined to fit upon the top flange of the mold piece 20 containing the outer concave portion. The other mold piece 22 is secured by conventional means.

In one method of practicing the invention, the mold pieces are placed in contact forming a lens-shaped cavity and are welded. Monomer is then supplied to the cavity either by a conventional, two-part sprue and riser, or the pieces may be joined under vacuum and the monomer injected into a single port. In the present embodiment, however, the mold piece 22 containing the inner concave portion is supplied with a monomer mixture such as that described in U.S. Pat. No. 4,495,313 and the mold pieces then welded. The monomer mixture 23 is polymerized by means such as exposure to ultraviolet light for a suitable length of time, as is known in the art.

This method of practicing the invention tends to produce cavitation in the monomer opacifying the liquid and producing cloudy lenses. When the horn is machined so as to extend within the outer concave portion of the mold piece containing such portion and not touch the flange of that piece, however, such cavitation and opacifying are eliminated. The following table shows welds that were made using a 1 to 2.5 booster for tests 1 through 5 and a 1 to 2 booster for samples 6 through 13. The ultrasonic welding equipment allows either energy or time to be a set parameter.

The remaining parameter can be measured if the appropriate measurement equipment is at hand.

| TEST | PRELOAD (lbs) | ENERGY (Joules) | TIME (msec) |
|---|---|---|---|
| 1 | 60 | 10 | 65 |
| 2 | 30 | 10 | 65 |
| 3 | 30 | 20 | 125 |
| 4 | 30 | 40 | 275 |
| 5 | 15 | 40 | — |
| 6 | 30 | 40 | 320 |
| 7 | 60 | 40 | 265 |
| 8 | 60 | 10 | 70 |
| 9 | 60 | 20 | 145 |
| 10 | 60 | 5 | 35 |
| 11 | 80 | 5 | — |
| 12 | 70 | 5 | — |
| 13 | 70 | 1 | — |

In this set, tests 2 and 8 yielded the best results, producing a weld that held firmly but was readily separated. It is noted that the parameters on test 2 and 8 are near the low end of the parameters tested.

Additional laboratory tests were conducted using low welding energies and small amplitude modifications. The following table shows welds that were made using a 1 to 1 booster for tests 14 through 19 and a 1 to 0.6 booster for samples 20 through 24. All tests were deemed to yield welds that held firmly yet were releasible after polymerization of the lens.

| TEST | PRELOAD (LBS) | ENERGY (Joules) | TIME (mSEC) |
|---|---|---|---|
| 14 | 60 | 1 | — |
| 15 | 60 | 2 | — |
| 16 | 20 | 1 | — |
| 17 | 20 | 3 | — |
| 18 | 40 | — | 50 |
| 19 | 60 | — | 50 |
| 20 | 5 | 5 | — |
| 21 | 3 | 5 | — |
| 22 | 1 | 5 | — |
| 23 | 60 | 1 | — |
| 24 | 60 | 2 | — |

After processing according to the present invention as described above, the monomer is cured and the lens removed from the mold by separating the two mold pieces such as by hand using a knife edge.

Diluent that is present in the monomer mixture is then removed and replaced with saline solution in the conventional manner, typically as described in U.S. Pat. No. 4,889,664.

The lens when completed was viewed under an optical microscope at 13 power, tests 14, 15, 18, 19, 23 and 24 yielded the best results, producing transparent lenses with smooth edges.

The method of the present invention has the further advantage of producing a uniform mating periphery between the two mold pieces. This is due to the fact that melting of the polystyrene begins at the contact point between the two pieces and any unevenness is eliminated by first melting the raised portions. This in turn yields a better lens edge. In addition, the method of the present invention has the advantages of allowing better thickness control of the lens and better control along the rotational axis, important in manufacturing toric lenses by the above described molding techniques.

As discussed above, the use of ultrasonic welding allows the use of less precise mold edges because any imperfections are eliminated during the welding process.

I claim:

1. A method of making a contact lens, comprising:

forming first and second mold pieces from materials suitable for ultrasonic welding, wherein one of said mold pieces has a convex surface portion for shaping a first lens surface, and the other of said mold pieces has a concave surface portion for shaping a second lens surface, wherein the first of said mold pieces includes an annular projection extending completely around the surface portion of the first mold piece;

moving the first and second mold pieces together to form a mold cavity therebetween for molding a contact lens, including the step of moving said annular projection into engagement with the second mold piece along an annular boundary extending completely around the surface portion of the second mold piece;

supplying a monomer mixture to the concave surface;

holding stationary one of the mold pieces, and applying linear vibration to the non-stationary mold piece at substantially right angles to the direction of contact, causing said softening by friction-induced heating, to fuse the first and second mold pieces together over the complete length of said annular boundary, and wherein the mold pieces are capable of later being separated; and polymerizing the monomer mixture to form a polymerized contact lens.

2. A method of making a contact lens, comprising:

forming first and second mold pieces from materials suitable for ultrasonic welding, wherein one of said mold pieces has a convex surface portion for shaping a first lens surface, and the other of said mold pieces has a concave surface portion for shaping a second lens surface, wherein the first of said mold pieces includes an annular projection extending completely around the surface portion of the first mold piece;

moving the first and second mold pieces together to form a mold cavity therebetween for molding a contact lens, including the step of moving said annular projection into engagement with the second mold piece along an annular boundary extending completely around the surface portion of the second mold piece;

supplying a monomer mixture to the concave surface;

holding stationary one of the mold pieces, and applying heat to the non-stationary mold piece by contact with a heated platen prior to placing said mold pieces in contact, to fuse the first and second mold pieces together over the complete length of said annular boundary, and wherein the mold pieces are capable of later being separated; and polymerizing the monomer mixture to form a polymerized contact lens.

3. A method of making a contact lens, comprising:

forming first and second mold pieces from materials suitable for ultrasonic welding, wherein one of said mold pieces has a convex surface portion for shaping a first lens surface, and the other of said mold pieces has a concave surface portion for shaping a second lens surface, wherein the first of said mold pieces includes an annular projection extending completely around the surface portion of the first mold piece;

moving the first and second mold pieces together to form a mold cavity therebetween for molding a contact lens, including the step of moving said annular projection into engagement with the second mold piece along an annular boundary extending completely around the surface portion of the second mold piece;

supplying a monomer mixture to the concave surface;

holding stationary one of the mold pieces, and applying rotational motion to the non-stationary mold piece about the rotationally symmetrical axis of the piece, causing said softening by friction-induced heating, to the other of the mold pieces to fuse the first and second mold pieces together over the complete length of said annular boundary, and wherein the mold pieces are capable of later being separated; and polymerizing the monomer mixture to form a polymerized contact lens.

4. An apparatus for releasably joining contact lens forming mold pieces having a projecting portion along a path exterior to and continuously adjoining the lens forming surfaces of said pieces, said apparatus comprising:

means for holding one of said mold pieces stationary, an ultrasonic energy horn sized to extend within an outer concave portion of said other mold piece comprising said outer concave portion, means for transmitting a centering force to engage the other of said mold pieces to said one mold piece held stationary;

means coupled to said horn for generating ultrasonic energy of a frequency and amplitude, and for a duration between that necessary to initiate softening of the projecting portion and to soften all of said projecting portion continuously adjoining the lens forming surface while maintaining said centering force.

5. An apparatus as claimed in claim 4, wherein said means for transmitting a centering force is a shoulder portion formed on said ultrasonic horn and extending beyond a flange portion of said other mold piece for centering said other mold piece in engagement with said one mold piece.

6. An apparatus as claimed in claim 5, wherein said means for transmitting a centering force further includes an O-ring device disposed along said shoulder portion for reducing transmission of ultrasonic vibrational energy.

* * * * *